United States Patent Office 3,220,799
Patented Nov. 30, 1965

3,220,799
TETRAFLUOROHYDRAZINE
Charles B. Colburn, Huntsville, Ala., assignor to Rohm & Haas Company, Philadelphia, Pa., a corporation of Delaware
No Drawing. Filed Aug. 13, 1958, Ser. No. 755,845
6 Claims. (Cl. 23—205)

This invention concerns tetrafluorohydrazine, $N_2F_4$, and a method for its preparation.

A previously known compound consisting of nitrogen and fluorine is nitrogen trifluoride, a stable compound which requires strong activation to undergo fluorine-like reactions.

This known compound serves as the starting material in the process of this invention, being converted at elevated temperatures on metal surfaces to the desired tetrafluorohydrazine. The process comprises heating nitrogen trifluoride to a temperature between 250° and 475° C. in the presence of a reactive metal surface and separating tetrafluorohydrazine.

The most effective of the metals appears to be copper, although surfaces of stainless steel, arsenic, antimony, and bismuth have also been found effective for converting nitrogen trifluoride to tetrafluorohydrazine.

The surface may be extended by use of gauze, turnings, or granules and even the surfaces of metal tubes have been observed to provide the needed action. The metal may be used in a bomb or in a tube which can be heated and into which or through which nitrogen trifluoride is passed.

Residence times in the heated apparatus are usually between five and thiry minutes with a preferred contact time of ten to fifteen minutes. This time in part depends upon the extent of surface and its reactivity, also upon temperature.

The desired reaction has been observed from about 250° to about 475° C. As between 250° and 375° C. rate of reaction is usually slow, it is preferred to operate from 375° C. to 450° C. Above about 475° C. other reactions than the desired one begin to dominate.

It is generally helpful to sweep out the apparatus with an inert gas. Also, the feed of nitrogen fluoride may be diluted with an inert noble gas, such as helium or argon. Thus one volume of helium may be used to help sweep ten volumes of nitrogen trifluoride through the apertures. Larger or small proportions of inert gas may likewise be used.

The process is usually operated by passing nitrogen trifluoride as a gas without or with a diluent into or through a heated zone containing the metal surface, collecting the reaction mixture and separating the desired tetrafluorohydrazine. The reaction mixture may be passed over sodium fluoride or into an alkali hydroxide solution to remove any hydrogen fluoride present, the sodium fluoride being desirably in the form of pellets. The gases are passed through a zone chilled to condense both products and starting material, from which the nitrogen trifluoride, boiling at −120° C. may be distilled, and the desired product, tetrafluorohydrazine is then obtained at −73° C. at normal pressure.

Another way of separating the desired product is through chromatographic absorption with helium being used as an inert carrier gas. Suitable solids for carrying out this separation by absorption are synthetic zeolites. A particularly useful absorption agent is the synthetic zeolite now available as Linde Molecular Sieve 13X, this product having proper absorptivity for permitting separation and concentration of tetrafluorohydrazine.

Linde Molecular Sieve 13X is described as having the composition $0.83 \pm 0.05$ $Na_2O$, $1.00$ $Al_2O_3$, $2.48 \pm 0.03$ $SiO_2$, and $xH_2O$. It has a pH of about 10 and is stable in the range of pH of 5 to 10.

The crystal structure is cubic, $a_0=24.95$ A., space group O 7/h–Fd3m, characterized by a 3-dimensional network with mutually connected intra-crystalline voids accessible through openings 13 A. in diameter (pore diameter). The void volume is 51 vol. −percent.

The product thus obtained has a molecular weight by gas density of 104 (theory 104). It gives a maximum in absorption of infrared at 10.40 microns. The vapor tension at low temperatures is given by the equation.

$$\log P \text{ (mm.)} = \frac{-692}{T} + 6.33$$

where T is absolute temperature. The latent heat of vaporization is estimated to be 3170 cal./mol. The critical temperature is experimentally 36° C. and the critical pressure is calculated to be 20 atmospheres.

Typical preparations of tetrafluorohydrazine are presented in the following examples.

Example 1

An apparatus was prepared comprising a tank of helium gas connected through a flow meter to a container holding nitrogen trifluoride at 142° K., which was connected to a reactor containing finely divided arsenic, this being connected to two cold traps. The first of these traps was chilled with solid carbon dioxide and acetone mixture and the second with liquid nitrogen.

Flow of helium was started at a rate permitting saturation of the gas stream with nitroen fluoride. The mixture of gases was passed into the reactor, which was held between 300° and 350° C. The unreacted nitrogen trifluoride was recovered from the cold traps and the tetrafluorohydrazine was passed to glass storage bulbs. It can be stored in glass over mercury. The product in the storage bulbs was examined by mass spectograph and infrared and found to be tetrafluorohydrazine. The product has the theoretical molecular weight.

Repetition of the above procedure with substitution of antimony for the arsenic led to the same result. The procedure was followed again with bismuth granules used to supply the metal surface. Tetrafluorohydrazine was likewise obtained.

In repetitions of these procedures it was found preferable to store the $N_2F_4$ in stainless steel cylinders.

Example 2

Containers holding helium and nitrogen trifluoride were connected through a water-containing trap to a reactor metal cylinder packed with copper turnings and heated to 375° C. From the reactor the gases were passed through a washer containing potassium hydroxide solution, through a trap cooled with solid carbon dioxide and acetone, and through a trap cooled with liquid nitrogen. The apparatus was flushed with nitrogen and flow of nitrogen trifluoride was adjusted to 100 cc./min. with the flow of helium adjusted to 10 cc./min. Nitrogen trifluoride was recovered from the traps, collected and re-used. Tetrafluorohydrazine was distilled into a stainless steel cylinder. The conversion was about 60%, varying from 42% to 62% in different preparations performed with variations in conditions. Yields in these preparations varied from 62% to 71% based on nitrogen trifluoride not recovered.

Repetitions of the above procedure were made at 400°, 425°, 450°, and 475° C. In each there was obtained tetrafluorohydrazine in good yields.

The presence of water vapor supplied by the bubbler seemed to control the activity of the metal surface so that good yields of $N_2F_4$ were obtained. Minor amounts of $N_2O$ which may appear in the effluent products are readily removed by chromatographic absorption.

Tetrafluorohydrazine is useful as a high energy oxidizer. It reacts with hydrazine, thus $$N_2F_4 + N_2H_4 \rightarrow 2N_2 + 4HF$$

The calculated specific impulse is 265 sec.; the calculated flame temperature is 4000° K., assuming equilibrium flow.

These values may be compared with those for reaction of oxygen and hydrazine, for which the calculated specific impulse is 273 sec. and the flame temperature is 3000° K. It will be seen tetrafluorohydrazine provides almost as high a specific impulse, but it differs from oxygen in being storable in liquid condition at normal temperatures, while liquid oxygen required low temperatures which bring many problems.

Thus, tetrafluorohydrazine may be stored in missiles which are ready for immediate launching.

Tetrafluorohydrazine can also be reacted with ammonia to provide a source of high energy and high impulse. The two may be metered together in a mixing chamber in a rocket where they are ignited and from which the hot gases pass through a nozzle to drive the rocket. The heat of reaction as determined by experiment is 3104 calories per gram of tetrafluorohydrazine. From this value it is calculated that the heat of formation of this compound is −47 kilocalories per mole.

I claim:

1. Tetrafluorohydrazine ($N_2F_4$).

2. A process for preparing tetrafluorohydrazine which comprises passing nitrogen trifluoride over copper at a temperature between 375° and 450° C. and separating tetrafluorohydrazine from the reaction mixture.

3. The process of claim 2 in which helium is used as an inert carrier gas.

4. A process for preparing tetrafluorohydrazine which comprises heating nitrogen trifluoride to a reacting temperature between 250° C. and 475° C. on a reactive surface selected from the group consisting of stainless steel, arsenic, antimony, and bismuth, and separating tetrafluorohydrazine from the reaction mixture.

5. A process for preparing tetrafluorohydrazine which comprises heating nitrogen trifluoride in the presence of a surface of arsenic at a reacting temperature between 250° and 475° C. and separating tetrafluorohydrazine from the reaction mixture.

6. A process for preparing tetrafluorohydrazine which comprises heating nitrogen trifluoride in the presence of a surface of copper at a reacting temperature between 250° and 475° C. and separating tetrafluorohydrazine from the reaction mixture.

References Cited by the Examiner

Colburn et al.: "J.A.C.S.," vol. 80, page 5004 (Sept. 20, 1958).

Leonard: "Journal of American Rocket Society," No. 72, p. 12, December 1947.

Mellor: "Comprehensive Treatise on Inorganic and Theoretical Chemistry," 1956, Supplement II, Part I, p. 59.

Morrow et al.: "Journal of the American Chemical Society," vol. 82, pp. 5301–5304 (1960).

Ruff et al.: "Zeitschrift für Anorganische und Allgemeine Chemie, vol. 197, pp. 395–398 (1931).

Simons: "Fluorine Chemistry," vol. 1, pp. 86–88, Academic Press, Inc., N.Y.C., 1950.

MAURICE A. BRINDISI, *Primary Examiner.*

ROGER L. CAMPBELL, WILLIAM G. WILES,
*Examiners.*